United States Patent [19]
Beck et al.

[11] 3,944,533
[45] Mar. 16, 1976

[54] POLYALKENAMERS OF WIDE MOLECULAR-WEIGHT DISTRIBUTION

[75] Inventors: Manfred Beck, Odenthal; Rainer Fritz, Leverkusen; Dieter Theisen, Remscheid, all of Germany

[73] Assignee: Bayer Aktiengesellschaft, Germany

[22] Filed: Aug. 20, 1974

[21] Appl. No.: 498,980

[30] Foreign Application Priority Data
Aug. 25, 1973 Germany............................ 2343093
Sept. 27, 1973 Germany............................ 2348680

[52] U.S. Cl............. 260/93.1; 260/80 C; 260/80 L
[51] Int. Cl.² C08F 4/44; C08F 36/00; C08F 136/00; C08F 236/00
[58] Field of Search ............................. 260/93.1 R

[56] References Cited
UNITED STATES PATENTS

| | | | |
|---|---|---|---|
| 3,631,010 | 12/1971 | Witte et al. | 260/93.1 |
| 3,632,849 | 1/1972 | Pampus et al. | 260/93.1 |
| 3,684,781 | 8/1972 | Nützel et al. | 260/93.1 |
| 3,776,895 | 12/1973 | van der Ven et al. | 260/93.1 |
| 3,798,175 | 3/1974 | Streck et al. | 260/93.1 |
| 3,804,803 | 4/1974 | Streck et al. | 260/93.1 |
| 3,816,384 | 6/1974 | Streck et al. | 260/93.1 |

FOREIGN PATENTS OR APPLICATIONS

| | | |
|---|---|---|
| 1,010,860 | 11/1965 | United Kingdom |

*Primary Examiner*—Joseph L. Schofer
*Assistant Examiner*—F. R. Cervi
*Attorney, Agent, or Firm*—Connolly and Hutz

[57] ABSTRACT

A process for the ring-opening polymerisation of cyclic olefins on catalysts of
 a. a halide of a metal of Groups VB and VIB of the Periodic System,
 b. an organometallic compound of a metal of Groups IIA, IIIA and IVa of the Periodic System, and
 c. optionally a cocatalyst, optionally in an inert organic solvent at temperatures of from −70 to +60°C, wherein from 0.1 to 10% by weight, based on monomer, of a compound containing a C=C-double bond in conjugation with a CO-double bond is added during or after polymerisation in the presence of the active catalyst.

8 Claims, No Drawings

POLYALKENAMERS OF WIDE MOLECULAR-WEIGHT DISTRIBUTION

It is known to polymerise cyclic olefins with ring-opening on catalysts of
a. metal halides of Group VB or VIB of the Periodic System,
b. organometallic compounds of metals of Group IIA, IIIA and IVA of the Periodic System, and
c. optionally cocatalysts
(German Offenlegungsschriften Nos. 1,770,491; 1,770,844 and British Patent No. 1,010,860).

In general, this polymerisation reaction is carried out with or without an organic solvent. The catalysts used can be preformed, although they are preferably prepared from their constituents in the presence of the monomer.

In all known polymerisation processes of this kind, rubber-like polymers of polyalkenamer structure having a narrow molecular weight distribution are obtained from cyclic olefins. Unfortunately, rubbers having a narrow molecular weight distribution are generally difficult to process, whereas rubbers having a wide molecular weight distribution are generally easy to process.

Accordingly, there is a need for polyalkenamers of a wide molecular weight distribution which are relatively easy to process.

Accordingly, the invention relates to a process for the ring-opening polymerisation of cyclic olefins on catalysts of
a. a metal halide of Groups VB or VIB of the Periodic System,
b. an organometallic compound of a metal of Groups IIA, IIIA and IVA of the Periodic System, and optionally
c. a co-catalyst,
optionally in an inert organic solvent at a temperature of from −70° to +60°C, wherein from 0.01 to 10% by weight, based on the total monomers, of a compound containing a C=C-double bond in conjugation with a CO-double bond is added during or after polymerisation in the presence of the active catalyst.

The polyalkenamers produced in this way show greater non-uniformity[1] and, hence, a wider molecular weight distribution than products produced without the addition. Their Defo elasticity is also greatly increased.

mers of the aforementioned kind can also be copolymerised. Cyclopentene is particularly preferred.

The compounds having C=C-bonds in conjugation with CO-bonds which are used in accordance with the invention for broadening the molecular weight distribution and raising Defo elasticity are, in particular, $\alpha$-$\beta$-unsaturated aliphatic monocarboxylic and polycarboxylic acids, $\alpha$-$\beta$-unsaturated aliphatic aldehydes and $\alpha$-$\beta$-unsaturated aliphatic ketones, and also derivatives of these compounds. The following compounds, for example, are suitable: acrylic acid and methacrylic acid, their $C_1$–$C_6$-alkyl esters and their nitriles, (e.g. acrylic acid methyl ester, acrylic acid butyl ester, methacrylic acid methyl ester, or acrylonitrile), maleic acid, maleic acid esters (e.g. maleic acid diethyl ester) and maleic acid anhydride, acrolein, methacrolein, vinylketone, divinylketone and cyclopentenone.

The quantity in which these compounds are added is generally from 0.1 to 10% by weight, based on monomer. In most cases, however, 0.1 to 1% by weight are sufficient. For instance, 0.1% by weight of acrolein is sufficient to increase non-uniformity U from 11 to 15. In the context of the invention, the non-uniformity is the quotient of the weight average of the molecular weight and the number average reduced by 1.

The effect to these additives is surprising because the presence of polar compounds is known to inhibit or even completely prevent polymerisation on organometallic mixed catalysts of the kind under consideration. Surprisingly, there is no significant reduction in conversion when the compound containing a C=C-double bond in conjugation with a CO-group is added to the polymerisation mixture after formation, but before deactivation, of the organometallic catalyst. The compound can be added during this period, i.e. at virtually any stage of the polymerisation process and, preferably, at the end of polymerisation. The actual time at which the compound is added is optional and is generally governed by the type and quantity of compound added.

The polymerisation process itself is known in principle. In general, the monomer is dissolved in a suitable solvent and the catalyst components are successively added. The monomer is generally used in the form of from 5 to 50% by weight solutions, preferably in the form of from 10 to 30% by weight solutions, in the organic solvent. Examples of suitable solvents include aliphatic hydrocarbons, such as butane, pentane, hexane, isooctane or cycloaliphatic hydrocarbons such as

[1] Non-uniformity $U = \dfrac{M_w}{M_n} - 1$   $M_w$ weight average of molecular weight   $M_n$ number average of molecular weight Cyclic olefins which are particularly suitable for the process are, in particular, monocyclic or dicyclic olefins having 1, 2 or more unsubstituted C=C-double bonds, preferably in non-conjugated arrangement. It is particularly preferred to use cyclomonoolefins having 5 or from 7 to 12 carbon atoms in the ring, such as cyclopentene, cycloheptene, cyclooctene, cyclodedecene; monocyclic, especially nonconjugated dienes with from 5 to 12 carbon atoms in the ring, such as cyclopentadiene, cyclooctadiene or corresponding cyclic trienes, such as cyclododecatriene. Polycyclic olefins, such as dicyclopentadiene, norbornene, norbornadiene, alkylidene norbornenes, are also suitable. Various monocyclohexane, also aromatic hydrocarbons such as benzene, toluene or xylene. The catalyst component (a) i.e. the heavy metal halide, should be present in a quantity of from 0.1 to 10 mMol per 100 g of monomer, preferably of from 0.5 to 2 mMol per 100 g of monomer. The molar ratio of the catalyst components (a) : (b) : (c) is generally 1 : 0.5–15 : 0–10. Polymerisation is generally carried out at a temperature of from −70 to +60°C, preferably at a temperature of from −20 to +20°C.

Particularly preferred catalysts are combinations of
a. tungsten or tantalum halides or oxyhalides such as $WCl_6$, $WBr_5$, $WCl_4O$, $TaCl_5$, b. organoaluminium or organo tin compounds, preferably corresponding to the general formula

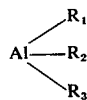

in which $R_1$ represents an alkyl group with 1 to 12 carbon atoms; $R_2$ represents an alkyl group with 1 to 12 carbon atoms or halogen (e.g. fluorine, chlorine, bromine, iodine); and $R_3$ represents an alkyl group with 1 to 12 carbon atoms, an alkoxy group with 1 to 12 carbon atoms or halogen (e.g. fluorine, chlorine, bromine, iodine), or the formula $Sn(R)_4$, where R is an alkyl radical with preferably 1 to 6 carbon atoms. It is particularly preferred to use triethylaluminium, trioctylaluminium, triisobutyl aluminium, aluminium diethyl chloride, aluminium diethyl bromide, aluminium ethyl dichloride, ethoxy aluminium diethyl, tin tetraethyl or tin tetrabutyl.

Preferred components (c) are
1. a halogen-containing alcohol corresponding to the formula

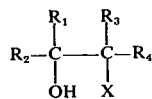

in which X represents chlorine, bromine or iodine; $R_1$ and $R_2$ represent hydrogen, chlorine, bromine, iodine, $C_1$–$C_6$-alkyl, $C_6$–$C_{12}$-aryl or alkylaryl; $R_3$ and $R_4$ represent chlorine, bromine, iodine, hydrogen, $C_1$–$C_6$-alkyl, $C_6$–$C_{12}$ aryl or alkylaryl; in addition to which $R_1$ and $R_3$, together with the carbon atoms on which they are situated, can form a hydrocarbon ring with 5 or more members. Particularly preferred components are 2-chlorethanol, 2-bromethanol, 2-iodethanol, 1,3-dichlor-2-propanol 2-chlorcyclohexanol 2-chlorcyclopentanol and 2,2,2-trichlorethanol:
2. epoxides corresponding to the general formula

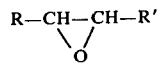

in which R and R' represent hydrogen $C_1$–$C_6$-alkyl, $C_1$–$C_6$-alkoxy, $C_1$–$C_6$ halogen alkyl (e.g. chloralkyl, bromalkyl) or hydroxyalkyl, preferably with 3 to 6 carbon atoms, such as for example ethylene oxide, propylene oxide, butylene oxide, butadiene monoxide, epichlorhydrin, epibromhydrin and allyl glycidyl ether.

The process according to the invention can be carried out continuously or in batches. On completion of polymerisation, the organometallic catalyst is deactivated and the polymer is recovered by precipitation or steam distillation.

EXAMPLE 1

250 ml cyclopentene (96%) were dissolved in 1200 ml of toluene (containing less than 2 ppm of $H_2O$). This was followed by the addition of a 1% solution of 1-butene in toluene, corresponding to 300 ppm, based on cyclopentene. After cooling to $-15°C$, 6.6 ml of a 0.1 m tungsten catalyst were added. The tungsten catalyst had been prepared by reacting $WCl_6$ with chlorethanol in toluene, in a molar ratio of 1 : 1.8. This was followed by the addition of 6.6 ml of a 0.3 molar solution of diethyl aluminium chloride in toluene. After 3 hours reaction, the conversion amounted to 85%. 50% of the solution were let off, the reaction was stopped by the addition of methanol and a stabiliser and the reaction product precipitated by allowing it to run into isopropanol (test A). The remainder was diluted by the addition of 150 ml of toluene, stirred for 15 minutes and then worked up in the same way as described above (test B).

The test was repeated in exactly the same way. Half the solution was then run off and worked up in the same way as described above (test C). 150 ml of a 1% by weight solution of acrolein in toluene were added to the remainder of the solution, followed by stirring for 15 minutes (0.1% of acrolein, based on cyclopentene) and working up (test D).

The results are set out in Table 1:

Table 1

|  | Toluene 25°C [η] | Defo hardness | Defo elasticity | Trans-content (%) | Acrolein | Conversion % |
| --- | --- | --- | --- | --- | --- | --- |
| Test A | 2.35 | 625 | 17 |  | none | 85.0 |
| Test B | 2.30 | 625 | 18 |  | " | 85.5 |
| Test C | 2.20 | 550 | 18 | 79.3 | " |  |
| Test D | 2.29 | 850 | 26 | 80.2 | 0.1 % | 87.0 |

In test B, there was no change in the properties of the product in relation to tests A and C despite dilution with toluene and a 15 minute increase in the polymerisation time.

The addition of acrolein (test D) clearly improves the Defo values, whilst only very slightly increasing the viscosity.

EXAMPLE 2

Cyclopentene was polymerised in the same way as described in Example 1, except that 1% by weight of acrolein, based on cyclopentene (in solution in toluene), was added 30 minutes after polymerisation began. The conversion of cyclopentene amounted to 71.0%. Polymerisation was carried out over a total period of 3 hours, and the polymer was subsequently worked up in the same way as described in Example 1. The final conversion amounted to 76.3%, i.e. the addition of acrolein during the polymerisation reaction did not affect it in any way.

EXAMPLE 3

0.1% of acrolein, based on cyclopentene, was added to a polymerisation mixture of the kind described in Example 1 before addition of the catalyst components. The solution turned reddish in colour. No polymerisation occurred.

EXAMPLE 4

A polymer solution prepared in accordance with Example 1 was divided before deactivation of the catalyst. One half was directly worked up, whilst 0.1% by weight of maleic acid anhydride, based on cyclopentene, in the form of a solution in toluene was added to the other half, followed by stirring for 15 minutes and then working up. Final conversion: 85.7%

| Crude rubber values: | $[\eta]$ | Defo hardness | Defo viscosity |
|---|---|---|---|
| Without maleic acid anhydride | 2.61 | 725 | 17 |
| With 0.1 % of maleic acid anhydride | 2.59 | 825 | 21 |

EXAMPLE 5

The procedure was as in Example 4, except that acrylic acid butyl ester (0.1% based on cyclopentene) was used instead of maleic acid anhydride. Final conversion: 82%.

| Crude rubber values: | Defo hardness | Defo elasticity |
|---|---|---|
| Without acrylic acid butyl ester | 675 | 15 |
| With 0.2 % of acrylic acid butyl ester | 625 | 18 |

EXAMPLE 6

1450 ml of a 20% by weight solution of cyclopentene (CPE) in dry toluene were introduced into a 2 litre autoclave. The tungsten catalyst mentioned in Example 1 (0.2 mMol of W per 100 g of CPE), 0.1 mMol of iodine per 100 g of CPE and 0.4 mMol of aluminium diethyl chloride per 100 g of CPE, were then successively added at room temperature. After a reaction time of 3 hours, 0.1% of acrolein (based on toluene), dissolved in toluene, was added, followed by stirring for 15 minutes and then by working up in the same way as described above (A). For comparison, a test was carried out in the absence of acrolein (B).

| Addition of acrolein | ML–4'/100°C | Defo hardness | Defo elasticity |
|---|---|---|---|
| (A) 0.1 % | 97 | 900 | 14 |
| (B) none | 95 | 575 | 7 |

EXAMPLE 7

A 5% by weight solution of acrolein in toluene was continuously added to a polymer solution obtained from a continuous cyclopentene polymerisation installation, in such a quantity that 0.1% by weight and 0.25% by weight of acrolein respectively based on the cyclopentene used, were present. After having been in contact with the acrolein for a period of 30 minutes, the solution was continuously deactivated with an aqueous ethylene diamine solution. The polymer was isolated by coagulation in hot water and dried in vacuo at 70°C. For comparison, a parallel test was carried out in the absence of acrolein. The results are shown in Table 2.

Table 2

| Addition of acrolein | ML–4' | Defo hardness/elasticity | $Mn \cdot 10^5$ | Mw g/mol | U (Mw/Mn)–1 |
|---|---|---|---|---|---|
| A) none | 100 | 600/6 | 0.189 | 2.33 | 11 |
| B) 0.1 % | 120 | 900/12 | 0.155 | 2.51 | 15 |
| C) 0.25 % | 136 | 1650/27 | 0.153 | 2.97 | 18 |

We claim:

1. A process for the ring-opening polymerisation of a cyclic olefin comprising:
   i. polymerising the cyclic olefin in the presence of a catalyst comprising:
       a. a metal halide of Groups VB or VIB of the Periodic System;
       b. an organometallic compound of a metal of Groups IIA, IIIA and IVA of the Periodic System; and
       c. optionally a co-catalyst at temperatures of from −70 to +60°C, and
   ii. adding from 0.01 to 10% by weight, based on the monomer used, of a Defo hardness increasing compound containing a C=C-double bond in conjugation with a CO-double bond, either during or after polymerisation.

2. A process as claimed in claim 1, in which the metal halide is a tungsten or tantalum halide or oxyhalide.

3. A process as claimed in claim 1, in which the organometallic compound corresponds to the formula

in which:
   $R_1$ is an alkyl group with 1 to 12 carbon atoms;
   $R_2$ is an alkyl group with 1 to 12 carbon atoms or halogen; and
   $R_3$ is an alkyl group with 1 to 12 carbon atoms, an alkoxy group with 1 to 12 carbon atoms or halogen, or corresponds to the formula $Sn(R)_4$
in which:
   R is an alkyl group with 1 to 6 carbon atoms.

4. A process as claimed in claim 1 in which the co-catalyst is either
   i. a halogen-containing alcohol of the formula

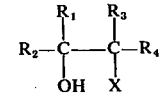

in which:
   X is chlorine, bromine, or iodine;
   $R_1$ and $R_2$, which may be the same or different, are hologen, chlorine, bromine, iodine, an alkyl group with from 1 to 6 carbon atoms, an aryl group with from 6 to 12 carbon atoms or an alkylaryl group;

and $R_3$ and $R_4$, which may be the same or different are chlorine, bromine, iodine, hydrogen, an alkyl group with from 1 to 6 carbon atoms, an aryl group with from 6 to 12 carbon atoms or an alkylaryl group, in addition to which $R_1$ and $R_3$, together with the carbon atoms to which they are attached, may form a hydrocarbon ring with 5 or more members;

or
ii. an expoxide of the formula

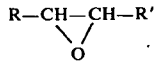

in which:
R and R', which may be the same or different, are hydrogen, an alkyl group with from 1 to 6 carbon atoms, an alkoxy group with from 1 to 6 carbon atoms or a hydroxyalkyl group.

5. A process as claimed in claim 1, in which the molar ratio of the catalyst components (a): (b) : (c) is 1 : 0.5 to 15 : 0 to 10.

6. A process as claimed in claim 1, in which the cyclic olefin is a monocyclic or dicyclic olefin in which the C=C-double bonds are in a non-conjugated arrangement.

7. A process as claimed in claim 1 in which the compound containing a C=C-double bond in conjugation with a CO-double bond is an $\alpha,\beta$-unsaturated aliphatic monocarboxylic or polycarboxylic acid, an $\alpha,\beta$-unsaturated aliphatic aldehyde and an $\alpha,\beta$-unsaturated aliphatic ketone.

8. A process as claimed in claim 1, in which the polymerization is carried out in the presence of an inert organic solvent.

* * * * *